2,989,512
POLYURETHANE PLASTICS CONTAINING SULFUR

Günther Nischk, Leverkusen, and Hans Holtschmidt, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed June 6, 1956, Ser. No. 589,579
Claims priority, application Germany June 10, 1955
6 Claims. (Cl. 260—77.5)

This invention relates to new polyurethane plastics and to a process for making the same. More particularly, the invention is concerned with polyurethane plastics containing SO and/or $SO_2$ groupings.

In copending application Serial No. 547,304, filed November 16, 1955 (German patent application F 16,160 IVc/39c), in the names of Hans Holtschmidt, Günther Nischk, and Wilhelm Kallert, there is disclosed and claimed a process for producing polyurethane plastics which comprises reacting a polyisocyanate with a polythioether containing terminal hydroxyl groups in the presence of a cross-linking agent. The polyurethane plastics thus obtained have the advantage of being stable to hydrolytic degradation. However, the strength values of these polyurethane plastics are in many cases lower than those of the conventional polyurethane plastics derived from polyisocyanates and hydroxyl polyesters. It is believed that the lower strength values of the polyurethane plastics based on hydroxyl polythioethers can be accounted for by the fact that the inter-molecular forces in the polythioethers are considerably lower than in the polyesters. This decrease in the inter-molecular forces will, of course, affect all those mechanical properties of the polyurethanes which are strongly influenced by association forces, such as tensile strength, structural strength and resistance to needle withdrawal.

It is an object of the present invention to provide polyurethane plastics derived from polythioethers which are stable to hydrolytic degradation and at the same time exhibit good mechanical properties. Another object is to provide a process for preparing such polyurethane plastics. Further objects will appear hereinafter.

It has now been found that the mechanical properties of polyurethane plastics can be substantially improved by introducing the strongly polar SO and/or $SO_2$ group into their molecule. Due to the presence of these groups, the intermolecular forces between the molecules are greatly increased whereby the strength values of the products are improved to such an extent that they are comparable with the corresponding polyurethane plastics derived from polyesters.

An improvement of the mechanical properties is particularly desirable in the case of rubber-like polyurethanes derived from polythioethers since the application of these products requires high structural and tensile strength.

In order to obtain the polyurethane plastics of the instant invention, an hydroxyl polythioether containing SO and/or $SO_2$ groups may be reacted with a polyisocyanate and a cross-linking agent. Alternatively, a polyisocyanate containing SO and/or $SO_2$ groups may be reacted with an ordinary hydroxyl polythioether and a cross-linking agent. A third option is to react an hydroxyl polythioether and a polyisocyanate with a cross-linking agent containing SO and/or $SO_2$ groups. Accordingly, the process of the instant invention comprises reacting a polythioether with hydroxyl end groups, a polyisocyanate and a cross-linking agent, at least one of said reactants containing at least one grouping selected from the class consisting of SO and $SO_2$ groupings. Thus, they may be obtained by reacting a thioether glycol with a glycol containing SO and/or $SO_2$ groups using temperatures ranging from 100° C. to about 300° C., preferably within the range of 150° C. to 250° C., and a dehydration catalyst to accelerate the reaction. Preferably this reaction is carried out in the presence of a glycol as a third reacting component.

Suitable thioether glycols for carrying out said reaction are compounds of the following general formula:

$$HO-R-(S-R''-)_nS-R'-OH$$

wherein R, R' stands for ethylene, propylene, which may be substituted by an alkyl-, cycloalkyl-, aryl- or aralkyl- group (such as methyl-, ethyl-, cyclohexyl, phenyl, benzyl), R'' for a bivalent organic residue such as ethylene, propylene, hexamethylene, decamethylene, cycloalkylene such as cyclohexylene, arylene, such as phenylene, diphenylene, naphthylene, aralkylene such as diphenylene methane, which may be substituted by hydrocarbon radicals, whereby R' and R may stand for the same or for different groups, and $n$ stands for a 0 or a whole integer from 1–5.

Examples of such thioether glycols are:

Thiodiglycol, 3,3'-dihydroxypropyl sulphide and mixed aromaticaliphatic thioether glycols, such as 1,4-(β-hydroxyethyl)-phenylene dithioether, and also analogous compounds of the naphthalene- and diphenyl-methane series, furthermore compounds of the formulae:

$$HO.(CH_2)_2S.(CH_2)_2.S.(CH_2)_2.OH$$

$$HO.(CH_2)_2.S(CH_2)_3.S.(CH_2)_2.OH$$

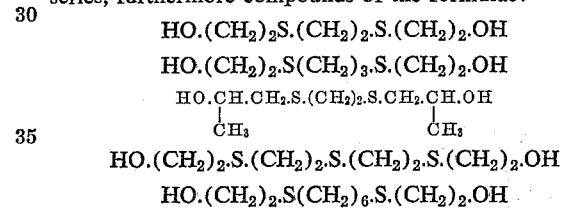

$$HO.(CH_2)_2.S.(CH_2)_2.S.(CH_2)_2.S.(CH_2)_2.OH$$

$$HO.(CH_2)_2.S(CH_2)_6.S.(CH_2)_2.OH$$

Suitable glycols containing a SO and/or $SO_2$ group which may be used in the above reaction are derived from the compounds of the above general formula by substituting at least one S-atom by a SO or $SO_2$ group. Representative examples of such glycols are thionyl diglycol, β,β'-dihydroxy-diethyl sulfone, 1,4-phenylene-bis-β-hydroxyethyl sulfone.

Suitable glycols for carrying out the above reaction are for instance alkylene glycol, diethylene glycol, triethylene glycol, 1,4-butanediol, 1,6-hexanediol, mixed aromatic-aliphatic glycols such as p-xylylene glycol, dihydroxyethyl hydroquinone, dihydroxyethyl-1,5-dihydroxy-naphthalene, 1,4-cyclohexanediol, butanedioxo diethyl glycol, dipropylene glycol, tripropylene glycol. These compounds represent bivalent alcohols in which the hydroxyl groups are bound to aliphatic residues.

An advantageous mode of preparing the polythioethers containing SO and/or $SO_2$ groups of the invention involves heating to a temperature of about 150° C.–200° C. a mixture of about 1 mol of a thioether with about 0.1–0.8 mol of a polythioether containing SO and/or $SO_2$ groups and if desired 0.2–1.5 mol of a glycol preferably in an inert atmosphere with the addition of a small amount, preferably 0.1 to 0.5% by weight, based on the weight of the mixture, of a dehydrating catalyst such as p-toluene sulfonic acid, phosphoric acid, potassium bisulfate, boron trifluoride, sulphonic acid esters as for instance toluene sulfolnic acid methyl ester. Water is split off at this temperature, this being completed in about 3 to 6 hours, depending upon the amount of catalyst. By utilizing a vacuum at the end of the reaction, the last residues of the water of reaction are split off and the polycondensation is completed.

The progress of the condensation can be followed by continual determination of the OH number or the viscosity of the melt. By choosing suitable reaction times, which can easily be determined empirically in the manner indicated, it is possible to produce polythioethers of different molecular weights. Condensation products of molecular weights between 600 and 10,000, preferably 1000–5000, are especially suitable for carrying out the process of the present invention.

Two other syntheses of hydroxyl polythioethers containing SO and/or $SO_2$ groups start with regular hydroxyl polythioethers. Thus, the latter may be oxidized with weak oxidizing agents to convert part of the sulfur atoms into SO and/or $SO_2$ groups. Alternatively, an hydroxyl polythioether may be reacted with a polyisocyanate containing a SO and/or $SO_2$ group to form an isocyanate-modified polythioether containing SO and/or $SO_2$ groups.

An advantageous method of oxidizing hydroxyl polythioethers to obtain hydroxyl polythioethers containing SO and/or $SO_2$ groups involves mixing the hydroxyl polythioether at room temperature or at elevated temperature with the calculated amount of dilute hydrogen peroxide and removing the water formed in the oxidation by applying a vacuum after the exothermic reaction has subsided.

If the polyurethane plastics of the instant invention are to be prepared from a polyisocyanate containing a SO and/or $SO_2$ group, either via the intermediate stage of an isocyanate-modified polythioether or by direct reaction with an hydroxyl polythioether and a cross-linking agent, there may be used benzidine sulfone diisocyanate of the formula

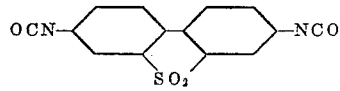

diphenyl sulfone-4,4'-diisocyanate and diphenyl sulfoxide-4,4'-diisocyanate.

Illustrative examples of cross-linking agents containing a SO or $SO_2$ group which may be employed include 4,4'-diaminodiphenyl sulfone, $\beta,\beta'$-diaminodiethyl-1,4-phenylene disulfone and $\beta,\beta'$-dihydroxydiethyl sulfone, thionyldiglycol, $\beta,\beta'$-dihydroxyethyl-4,4'-diphenylsulfone ether. Generally speaking, all those glycols containing SO and/or $SO_2$ groups are suitable which are disclosed in connection with the preparation of the polythioethers containing SO and/or $SO_2$ groups.

The conditions of reaction and the molar ratio of the reactants used in the process of the invention are substantially the same as those commonly employed in the production of polyurethanes from hydroxyl polyesters, diisocyanates and cross-linking agents. For details as to this reaction, reference may be had to German Patents 831,604; 831,772; 838,652; 838,826; 872,268 and copending application Serial No. 518,942, filed June 29, 1955, now U.S. Patent 2,916,472.

In carrying out the process of the invention, the reactant containing SO and/or $SO_2$ groupings is used in such an amount as to obtain a polyurethane containing about 5 to 75% of its sulfur in the form of SO and/or $SO_2$ groups. By varying the amount of SO and/or $SO_2$ groups in proportion to the total amount of sulfur, it is possible to produce polyurethanes of a great variety of properties, ranging from leather-like materials when the content of SO and/or $SO_2$ groups surpasses about 50% (as shown above) to highly elastic products with resistance to cold when less than 50% of the sulfur, preferably 20–40%, are present in the form of SO and/or $SO_2$ groups.

A specific embodiment of the process of the invention involves reacting at elevated temperature, preferably at 80° C. to 150° C., an hydroxyl polythioether with excess diisocyanate (preferably 1.2–2.5 mols diisocyanate per 1 mol polythioether) to obtain an isocyaante-modified polythioether containing free isocyanate groups and heating the latter, preferably at about the same temperature, with a cross-linking agent, such as an alkylene glycol, a diamine or water (preferably 2–10% by weight as calculated on the amount of polythioether) to form a cross-linked polyurethane rubber, at least one of the reactants containing SO and/or $SO_2$ groupings. Suitable cross-linking agents are for instance butanediol-1,4, cyclohexanediol-1,4, 3,3'-dichlorobenzidine, 2,5-dichloro-p-phenylene diamine. In accordance with another embodiment of the process of the invention, an hydroxyl polythioether is reacted at elevated temperatures as disclosed above with excess diisocyanate to obtain an isocyanate-modified polythioether containing free isocyanato groups whereupon this product is reacted at elevated temperature with a glycol and/or a diamine in such an amount as to produce an intermediate containing free hydroxyl and/or amino groups. This intermediate is storage stable and can be cured at any desired later time by reaction at elevated temperatures, preferably at 100° C.–150° C., with a diisocyanate, preferably in the form of a dimeric diisocyanate, which results in the formation of a rubber-like material. Either in the first step or in the second step, there is used at least one component containing SO and/or $SO_2$ groups.

The process of the instant invention is not restricted to the use of individual reactants, but the reactants may also be used in the form of mixtures of two or more analogous compounds. Thus, a mixture of an ordinary hydroxyl polythioether and an hydroxyl polythioether containing SO and/or $SO_2$ groups may be reacted with a polyisocyanate and a cross-linking agent. Alternatively, the polyisocyanate component can be a mixture of a diisocyanate without SO and/or $SO_2$ groups and a diisocyanate containing SO and/or $SO_2$ groups. Finally, the cross-linking agent may be employed in the form of a mixture of glycols or diamines or of a glycol with a diamine, one or more of said glycols or diamines containing SO and/or $SO_2$ groups. The reactant or reactants containing SO and/or $SO_2$ groups are preferably present in such an amount as to form a final product containing 5 to 75% of its sulfur in the form of SO and/or $SO_2$ groups, as stated above.

In the process of the invention, there may also be employed active fillers and plasticisers, such as carbon black, fuller's earth, zinc oxide, iron oxide, phthalic acid dibutyl ester, sebacic acid dioctylester, thiodibutyric acid dibutylester, which in many cases will act beneficially on the properties of the final product.

The polyurethane plastics of the instant invention find the same applications as the conventional polyurethane plastics. Owing to their resistance to hydrolytic degradation, they are particularly suitable for use in the production of articles that come into contact with chemicals. Representative examples of such articles of manufacture include packings and tubes to be used in the construction of chemical equipment.

The invention is further illustrated by the following examples, but it is to be understood that these examples are given by way of illustration and not of limitation.

*Example 1*

3000 parts of a polythioether which has been prepared by condensation of 1 mol of hexanediol with 1 mol of thiodiglycol are heated to 60° C. A mixture consisting of 360 parts of 30% hydrogen peroxide and 360 cc. of acetone is added gradually while stirring. The temperature during this period is not to exceed 80° C. The mixture is stirred for a further 30 minutes at 70° C. and the acetone-water mixture is removed with a vacuum of 20 mm. and an internal temperature of 80° C. The dehydration period is about 15 hours altogether. The OH number of the oxidized polythioether is 80.

400 parts of this polythioether are then mixed while stirring with 18 parts of quinitol and treated with 56 parts of paraphenylene diisocyanate. When a temperature of 128° C. is reached, the thickly viscous mass is expressed and heated for a further 12 hours at 100° C. 24 parts of the dimeric toluylene diisocyanate-2,4

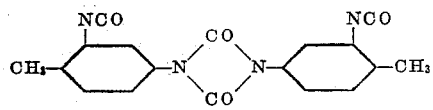

are then incorporated by rolling on a roll at room temperature into 200 parts of polythioether sheet and pressed for 30 minutes at 150° C. to form a test sheet.

Mechanical values after a heat treatment for 12 hours at 100° C.:

Thickness of test sheet _____mm____ 3.7
Tensile strength _____kg./cm.² ____ 211
Breaking elongation _____percent____ 580
Permanent elongation after 1 minute ____do_____ 15
Resistance to needle scratch _____kg./cm.____ 62
Structural strength (fan test) _____kg./cm.____ 31
Loading with 20% elongation _____kg./cm.² ____ 14
Loading with 300% elongation _____kg./cm.² ____ 88
Elasticity _____percent_____ 46
Shore hardness _____ 82

If 28 parts of the dimeric toluylene diisocyanate-2,4 are incorporated by rolling into 200 parts of the above rolled sheet, a test sheet thereof has the following mechanical properties:

Thickness of sheet _____mm____ 3.6
Tensile strength _____kg./cm.² ____ 200
Breaking elongation _____percent____ 580
Permanent elongation _____do_____ 14
Elasticity _____do_____ 45
Shore hardness _____ 82
Needle scratch resistance _____kg./cm.² ____ 73
Structural strength (fan test):
  (a) 40 kg./cm. (sheet thickness) ____mm____ 4.1
  (b) 53 kg./cm. (sheet thickness) ____mm____ 4

*Example 2*

600 parts of a polyether which has been prepared by condensation of 1 mol of thioglycol with 1 mol of 1,4-butanediol, are oxidised as indicated in Example 1; the OH number of the polyether is 79. 144 g. of 1,5-naphthylene diisocyanate are thereafter added at 126° C. 6 cc. of water are stirred therein after a reaction time of 10 minutes. The mixture is allowed to react in the stirrer-type vessel until the reaction product has assumed a firm friable consistency. After this material has been pressed a product having elastomeric properties is obtained, the mechanical properties of which are equivalent to those of Example 1.

*Example 3*

4 mols of thiodiglycol are condensed with 3 mols of 1,4-butanediol and 1 mol of thionyl diglycol $$(HO(CH_2)_2SO(CH_2)_2OH)$$

by heating these components in an inert atmosphere for about 4 hours at 160° C. while distilling off the formed water and thereafter continuing the heating under vacuum for about 2 hours, so that the OH number of the reaction product is 56. 300 g. of this polyether in the presence of 0.3% by weight of p-toluene sulfonic acid are mixed at 130° C. with 54 g. of 1,5-naphthylene diisocyanate. On completion of the reaction, 6 g. of 1,4-butylene glycol are incorporated by stirring and the reaction product is cast on to waxed metal plates. The mechanical properties of the cast sheet as obtained after a final heating period of 24 hours to 100° C. are equivalent to those of Example 1.

*Example 4*

40 g. of thionyl diglycol $HO(CH_2)_2SO(CH_2)_2OH$ are added to 1000 g. of a thiodiglycol-1,4-butylene glycol polyether with the OH number of 180. After being dehydrated at 120° C. the mixture is cooled to 100° C. and 200 g. of 1,6-hexane diisocyanate are slowly added dropwise. After having added the diisocyanate, the mixture is stirred for a further hour at 100° C. The result is a polyether with the OH number of 64.5, this polyether solidifying to a solid wax-like mass on cooling.

54. g. of 1,5-naphthylene diisocyanate are stirred into 300 g. of the polyether thus obtained, this taking place at 126° C. The reaction is completed after 10 minutes. After incorporating 18 g. of 1,4-butylene glycol by stirring, the mixture is poured into waxed moulds heated to 100° C. The moulded elements can be removed from the moulds after 35 minutes and show the following values after having been heated for a further 24 hours at 100° C.:

Tensile strength _____kg./cm.² __ 190
Breaking elongation _____percent__ 625
Permanent elongation _____do____ 28
Loading at 300% elongation _____kg./cm.² __ 79
Loading at 20% elongation _____kg./cm.² __ 25
Tear resistance (fan test) _____kg./cm.____ 38
Elasticity _____percent__ 49
Shore hardness _____ 79

*Example 5*

450 parts of 30% hydrogen peroxide are added gradually to 3000 parts of a polythioether prepared from 1 mol of hexanediol and 1 mol of thiodiglycol, the temperature being between 60 and 80° C. The mixture is stirred for a further 30 minutes while the temperature is kept at 65° C. and thereafter the water is removed in vacuo by heating for 24 hours at 90° C.

400 parts of the polythioether oxidized in this manner and having the OH number of 70 are thoroughly stirred with 21.5 parts of thionyl diglycol at 100° C. and then mixed with 59 parts of p-phenylene diisocyanate. When a temperature of 130° C. is reached, the viscous melt is extracted and heated for another 12 hours at 100° C.

26 parts of the dimeric toluylene diisocyanate-2,4

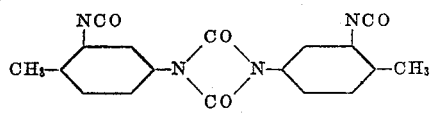

are incorporated by rolling on a roll into the isocyanate-modified polyethers prepared in this way. The material is pressed for 30 minutes at 150° C. and the pressed sheet is finally heated for 12 hours at 100° C. This sheet then has the following mechanical properties:

Tensile strength _____ kg./cm.² __ 200
Breaking elongation _____percent__ 610
Permanent elongation _____do____ 15
Elasticity _____do____ 45
Shore hardness _____ 80
Structure fan test _____kg./cm.__ 35

While certain representative embodiments and details have been shown for the purpose of illustrating this invention, it will be apparent to those skilled in the art that various changes and modifications may be made therein without departing from the spirit and scope of the invention.

What is claimed is:

1. A polyurethane plastic prepared by a process which comprises reacting a polyalkylene ether-polythioether having terminal hydroxyl groups and a molecular weight of at least about 600, said polyalkylene ether-polythioether containing in its chain at least one member selected from the class consisting of —SO— and —SO₂— groups wherein the S atom lies between carbon atoms of the chain, with an excess of an organic polyisocyanate based on the hydroxyl groups of said polyalkylene ether-polythioether and a member selected from the class consisting of alkylene glycols, diamines and water to form a cured polyurethane.

2. A process for making polyurethane plastics which comprises reacting a polyalkylene ether-polythioether having terminal hydroxyl groups and a molecular weight of at least about 600, said polyalkylene ether-polythioether containing in its chain at least one member selected from the class consisting of —SO— and —SO$_2$— groups wherein the S atom lies between carbon atoms of the chain, with an excess of an organic polyisocyanate based on the hydroxyl groups of said polyalkylene ether-polythioether and a member selected from the class consisting of alkylene glycols, diamines and water to form a cured polyurethane.

3. The product of claim 1 wherein from about 5 percent to about 75 percent of the sulfur atoms in the polyurethane plastic are in the form of said —SO— and —SO$_2$— groups.

4. The product of claim 1 wherein from about 20 percent to about 40 percent of the sulfur atoms in the polyurethane plastic are in the form of said —SO— and —SO$_2$— groups.

5. A polyurethane plastic prepared by a process which comprises reacting a polyalkylene ether-polythioether having terminal hydroxyl groups and a molecular weight of at least about 600, said polyalkylene ether-polythioether containing in its chain at least one member selected from the class consisting of —SO— and —SO$_2$— groups wherein the S atom lies between carbon atoms of the chain, with an excess of an organic polyisocyanate based on the hydroxyl groups of said polyalkylene ether-polythioether to form an isocyanate-modified polyalkylene ether-polythioether containing —NCO groups, reacting the said isocyanate-modified polyalkylene ether-polythioether with a member selected from the class consisting of alkylene glycols, diamines, and water to form an intermediate which is free of —NCO groups, and thereafter reacting said intermediate with a dimeric aromatic diisocyanate to form a cured polyurethane plastic.

6. A process for making a polyurethane plastic which comprises reacting a polyalkylene ether-polythioether having terminal hydroxyl groups and a molecular weight of at least about 600, said polyalkylene ether-polythioether containing in its chain at least one member selected from the class consisting of —SO— and —SO$_2$— groups wherein the S atom lies between carbon atoms of the chain, with an excess of an organic polyisocyanate based on the hydroxyl groups of said polyalkylene ether-polythioether to form an isocyanate-modified polyalkylene ether-polythioether containing —NCO groups, reacting the said isocyanate-modified polyalkylene ether-polythioether with a member selected from the class consisting of alkylene glycols, diamines, and water to form an intermediate which is free of —NCO groups, and thereafter reacting said intermediate with a dimeric aromatic diisocyanate to form a cured polyurethane plastic.

References Cited in the file of this patent

UNITED STATES PATENTS

| 2,692,873 | Langerak et al. | Oct. 26, 1954 |
| 2,723,935 | Rodman | Nov. 15, 1955 |
| 2,734,045 | Nelson | Feb. 7, 1956 |
| 2,835,654 | Carter | May 20, 1958 |
| 2,858,296 | Stilmar | Oct. 28, 1958 |

FOREIGN PATENTS

| 894,134 | France | Dec. 14, 1944 |
| 894,199 | France | Dec. 15, 1944 |
| 895,750 | France | Feb. 1, 1945 |
| 1,108,785 | France | Sept. 14, 1955 |
| 908,196 | Germany | Apr. 1, 1954 |

OTHER REFERENCES

Siefken, Leebig's Annalen der chemie, vol. 562, 1949, pp. 132–136.